July 30, 1935.  W. HULSEBOS  2,009,495

WABBLER ENGINE

Filed Aug. 11, 1934

Inventor
Wichert Hulsebos
by [signature] Atty.

Patented July 30, 1935

2,009,495

UNITED STATES PATENT OFFICE 2,009,495

WABBLER ENGINE

Wichert Hulsebos, Laren, Netherlands

Application August 11, 1934, Serial No. 739,493
In the Netherlands September 7, 1933

4 Claims. (Cl. 74—60)

This invention relates to an engine as disclosed, inter alia, in U. S. A. patent specification No. 790,374, i. e. to an engine comprising a plurality of cylinders arranged with their axes in parallel relation with and around the crank shaft and provided with means for transmitting to the engine frame the axial pressure exerted by the pistons upon the wabbler. In accordance with said earlier specification, the axial pressure acting upon the wabbler is transmitted in the frame through a conical face provided on the wabbler and adapted, during operation of the engine, to roll on a mating conical face provided on the frame.

The object of my present invention is to improve said prior construction. In accordance with my invention, either one or both of the elements provided with said conical faces is or are freely rotatable, about the axis of the corresponding cone, relative to the corresponding element (wabbler or frame). Owing to this construction, the unavoidable minor inaccuracies in the conical faces are compensated for, it being understood that these inaccuracies would otherwise tend to set up considerable axial stresses resulting in great frictional resistances.

With the aforesaid improvement of the prior construction it is no longer necessary for the cooperating bearing faces to be conical. Said faces may be curved in axial section, whereby the detrimental influence of inaccuracies in the construction is still further reduced and whereby it may even be obviated that the wabbler bearing on the side of said faces is loaded by radial components of the total stress exerted by the wabbling bearing face upon its mating face. In operation, therefore, the bearing faces, which engage one another with a small amount of clearance, will tend automatically to assume the correct relative contacting positions.

Finally, I suggest to fully relieve the wabbler bearing from any stress that is likely to act thereon by having the one bearing face embrace to a certain extent, the other bearing face, whereby, as will be understood, the wabbler bearing may be entirely dispensed with.

Figure 1:
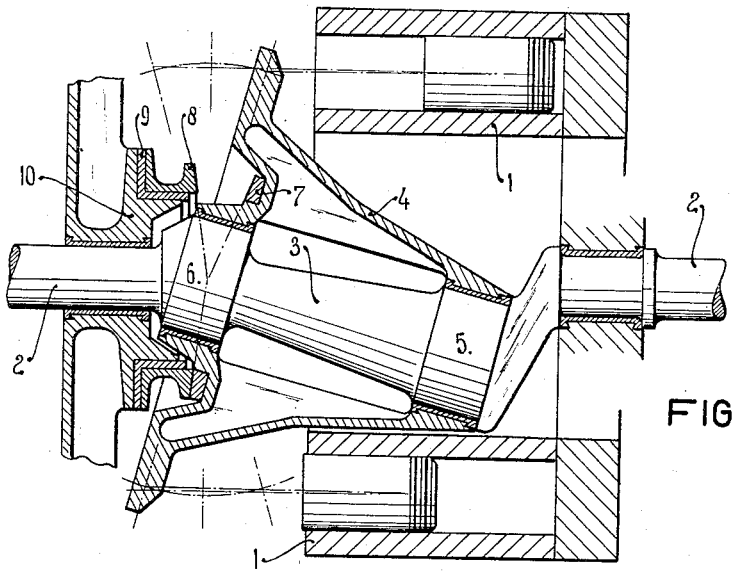
Figure 2:
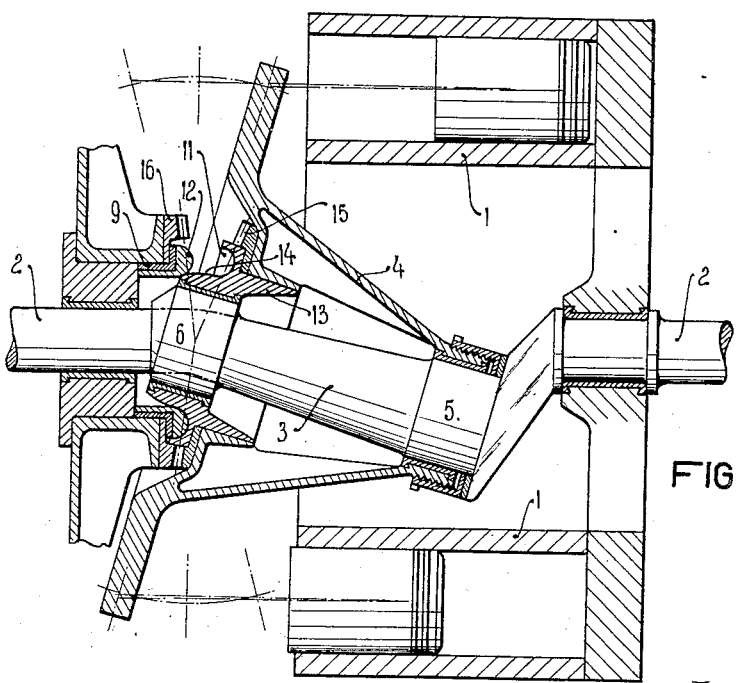

On the annexed drawing, Figs. 1 and 2 illustrate, by way of example only and in axial sectional elevations, two different embodiments of my invention.

The cylinders 1 are disposed equidistantly from the crank shaft 2 and in parallel relation therewith, the oblique crank 3 carrying the wabbler 4. Said wabbler is fitted with coaxial hub portions engaging the trunnions 5 and 6 of the crank 3, on which they are freely rotatable. The piston rods, not shown, engage the peripheral portion of the wabbler 4 in any suitable manner.

Secured to the wabbler 4 is an annulus 7 having a conical bearing face cooperating with a mating conical bearing face of a member 8 rotatably mounted, through a slide disk 9, on the engine frame 10.

The considerable pressure between the conical faces 7 and 8, which acts upon a comparatively very small area, is thus distributed over the ample contacting surfaces of the members 8, 9 and 10. Therefore, if the cones 7 and 8 are not accurately constructed or mounted and thereby tend to cause sliding friction, member 8 can slightly rotate in the one or the other direction, thus ensuring a true relative rolling motion of cones 7 and 8.

The pressure between the plane contacting faces of members 8, 9 and 10 is so low that in view of the very restricted relative movements said surfaces can be amply lubricated in a very simple manner.

The slide disk 9, which is preferably made of gun metal, may of course be secured either to member 8, or to member 10, and it may even be dispensed with altogether.

In Fig. 2, the cooperating bearing faces are provided on members 11 and 12 and curved in axial section, whereby they have freedom of automatic relative adjustment. Member 11 is integral with a part 13 having a cylindrical outer surface fitting a corresponding inner surface of the wabbler 4, and also with a part 14 having a spherical surface coacting with the curved face of member 12, it being understood that the centre of said spherical surface coincides with the centre of movement of the wabbler.

It will thus be seen that correct engagement of parts 11, 14 and 12 is ensured under all conditions. Consequently, the wabbler no longer requires to be supported by the trunnion 6, and the crank may be shaped as indicated by dash and dot lines.

Mounted around members 11 and 12 are mating mitre wheels 15 and 16, respectively, which prevent rotation of the wabbler, as already disclosed by the aforesaid prior U. S. specification.

What I claim is:—

1. In an engine having a crank shaft, a frame element providing a bearing for one part of the crank shaft, a plurality of cylinders disposed equidistantly from said shaft in parallel relation therewith, pistons in said cylinders, a wabbler element associated with said pistons and providing a bearing for another part of the crank shaft and means for transmitting to the frame the axial pressure adapted to be exerted by the pistons upon the wabbler element, cooperating annular bearing faces provided on the wabbler element and on the frame element, respectively, at least one of said bearing faces bounding an annular member adapted for rotation, relative to the element on which said face is provided.

2. An engine in accordance with claim 1, in which both bearing faces, in an axial sectional plane, are curved in the same sense.

3. An engine in accordance with claim 1, in which both bearing faces, in an axial sectional plane, are curved in the same sense, the one bearing face embracing the other bearing face to such an extent that also radial components of the forces acting upon the wabbler are adapted to be taken up, through the bearing faces, by the frame element.

4. A construction as defined in claim 1, wherein both bearing faces have essentially the same diameter and are so arranged relative to the center of rotation of the wabbler as to roll one over the other.

WICHERT HULSEBOS.